Van Steenbergh & Egnon,
Ice Elevator.
No. 1,069. Reissued Oct. 23, 1860.
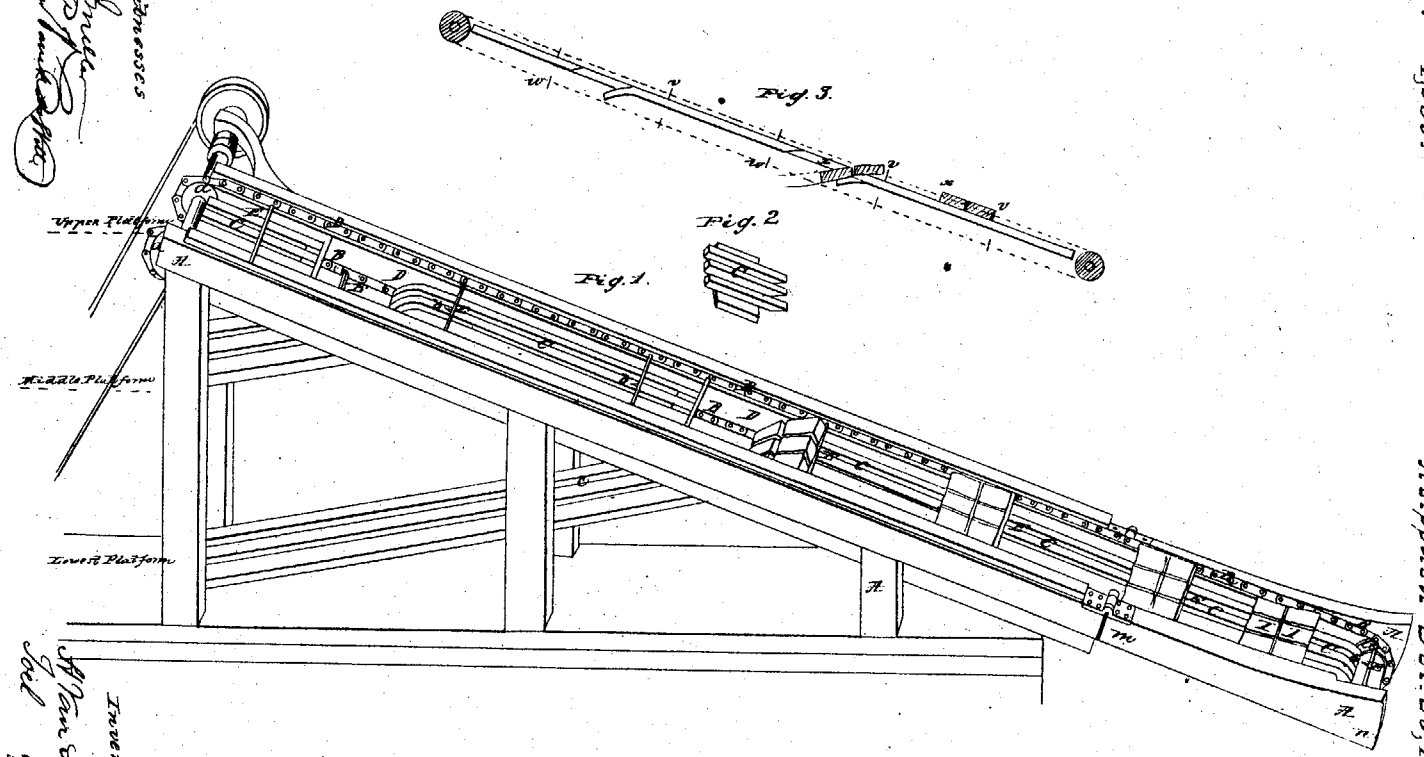
Witnesses
E. J. Miller
Inventor
A. Van Steenbergh
Joel Egnon

UNITED STATES PATENT OFFICE.

HIRAM VAN STEENBURGH AND JOEL EGNOR, OF CATSKILL, NEW YORK, ASSIGNORS TO THEMSELVES AND PETER BAURHYTE.

IMPROVEMENT IN APPARATUS FOR HOISTING AND STORING ICE.

Specification forming part of Letters Patent No. 22,210, dated November 30, 1858; Reissue No. 1,069, dated October 23, 1860.

*To all whom it may concern:*

Be it known that we, HIRAM VAN STEENBURGH and JOEL EGNOR, both of Catskill, in the county of Greene and State of New York, have invented certain improvements in the construction of a machine for hoisting cakes of ice from the surface of the water, and elevating them to the stories of ice-houses; and we do hereby declare that the following is a full, clear, and exact description of the same, reference being had to the annexed drawings, making a part of this specification.

Inclined planes for raising cakes of ice from the surface of the water to elevated places of storage have been long in use; also, the employment of endless chains passing around sheaves at each end of the planes to transport the ice along the planes is not new, but in such cases the cakes of ice have been laid upon the chains, and so carried up to the top of the planes and there delivered upon one of the platforms of the houses; but in the use of such apparatus it is necessary to shift the upper end of the plane from story to story of the platforms, as they are filled in succession—a matter occupying time and labor when every minute is of value in hurrying in the ice crop, and the incurring of a considerable expense at each change of elevation.

Our improvement has for its purpose the construction of a permanent elevator or plane of a height to deliver over the upper end of its endless chain ice upon the highest platform or story of the ice-house, and adapted without disarranging machinery, and with a very short delay in the working of the machine, to transfer the delivery of the cakes of ice to or from any of the stories of the house.

The machine is represented by Figure 1 in perspective. It is a timber frame, A A A A, having between its upper side timbers at each end a pair of shafts carrying sheaves or pulleys *a a a*, around which the endless chains B B revolve. The lower part of these timbers from *m* to *n* are formed, as is customary, into an apron (so called) hinged to the upper part so as to adapt it to various heights of water to make the deposit of ice upon it convenient. Between the upper and lower reaches of the chain extending across between the said timbers is a platform, (of slats,) C C, having at intervals openings D D, corresponding to the platforms attached to the different stories of the ice-house to which the machine belongs. Horizontally between the chains, and pivoted thereto, bars E E extend at suitable intervals, whose office it is to propel the ice cakes before them, sliding them up along the slats *c c*. For the purpose of holding the bars firmly against the ice iron points *b b* project from these bars.

The operation of the machine is as follows: The cakes I I of ice being floated over the lower end of the frame so as to lie in range between the chains, and the machine being started, they are caught by the lowest bar, E, as it comes around with the chains from beneath the lowest sheave, and are carried up, sliding along the slats *c c* until they reach the lower opening, D, when they drop through upon an inclined plane, G, leading to the lowest platform and story of the ice-house. When it becomes desirable to carry the ice higher, a hatch (shown in Fig. 2) corresponding with the slat-deck C is placed over the opening and secured there. Then the cakes of ice pass over it and are carried up to the next opening above and are delivered to the next upper platform of the house, which opening is closed, when needed, in a similar way, and any others in succession until the ice is delivered over the upper end of the chain into the upper story of the ice-house.

Care must be taken in arranging the position of the bars E that, in their passing, one on the lower reach of the chains in passing downward shall not obstruct the ice in its way through the openings in the slat-deck, which would not only stop the ice, but cause a break in the chain.

Diagram Fig. 3 shows the way of arranging this part of the machinery. It represents a vertical section of the machine.

It having been determined what extent along the plane the ice to be carried up by any one bar, V, shall occupy, as from X to Y, it can easily be determined where the lower bar, W, shall be placed to avoid interruption. This being settled, the chain must be divided into equal parts, corresponding with the distance from V to a point opposite W on the

2 upper chain, or when that cannot be exactly done, then into the nearest series of equal distances that can be made by exceeding the distance between V and W. Thus, if the space between V and W must be eight feet (8 feet) and the chain be one hundred and ninety-two feet (192 feet) long, it could be divided into twenty-four (24) parts of eight feet (8 feet) exactly; but if the chain should be one hundred and ninety-eight feet and nine inches (198 feet, 9 inches) long, it should be divided into twenty-three (23) parts of eight feet and three inches (8 feet, 3 inches) each.

It is very evident that instead of causing the endless chains, with the propelling-bars, to return to their lowest point by passing beneath the inclined plane, they may, without affecting the principle of this invention, be made to return to that point by being raised above that plane sufficiently to be out of the way of the ascending blocks of ice. In that case no attention need be paid to the spacing of the propelling-bars, nor to the leaving of openings in the masses of ascending ice; but we prefer the arrangement hereinbefore set forth.

We are aware of the contrivance of Cornelius Wortendyke, patented November 13, 1855, by which he proposed to deliver cakes of ice at different elevations in an ice-house by means of a single endless chain with hooks of a particular kind attached to it at regular intervals. To this we make no claim, and regard our contrivance as essentially different from it. His arrangement was only calculated to carry up one cake of ice at a time, whereas, by using the two parallel endless chains sufficiently far apart, with suitable bars between them at proper intervals, he spaces thus left may be almost entirely filled with cakes of ice, and thus an almost continuous mass of ice may be kept moving up the inclined plane and be regularly distributed at the height which is desired. We do not therefore claim the use of an inclined plane to be used in connection with a single endless chain, however arranged, for the purpose of elevating ice. Nor do we claim the use of an inclined plane combined with two parallel endless chains when so arranged that either the position of the plane or length or number of the endless chains require to be changed in order to raise the ice to a new and different elevation; but 1. The method of transporting ice upon inclined planes, by carrying the ice up between parallel endless chains having bars extended between said planes to hold the ice and to propel the same, the planes being pierced with openings for the passage of the ice to the successive stories of the ice-houses, and the propelling-bars being so arranged that the descending bars shall not interfere with the free passage of ice through the openings in the plane.

2. The use of inclined planes for elevating ice when each is provided with two parallel endless chains with suitable bars between them at proper distances apart to hold and propel the ice, when the planes are provided with spaces which can be left open when the ice is to be elevated to the height of those openings respectively, and which can be successively closed when the ice is to be elevated to a greater height, substantially in the manner herein set forth.

3. The use of the hatches described to close the openings in the plane in order to permit the ice to pass beyond a lower to an upper story of the ice-house, when used in combination with two parallel endless chains, substantially as herein described and set forth.

HIRAM VAN STEENBURGH.
JOEL EGNOR.

Witnesses:
EDGAR RUSSELL,
JOHN F. SYLVESTER.